(12) United States Patent
Xiao

(10) Patent No.: US 9,571,597 B2
(45) Date of Patent: Feb. 14, 2017

(54) MULTIMEDIA FILE PUSH METHOD AND APPARATUS

(71) Applicant: Tencent Technology (Shenzhen) Company Limited, Shenzhen (CN)

(72) Inventor: Lei Xiao, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 0 days.

(21) Appl. No.: 14/978,309

(22) Filed: Dec. 22, 2015

(65) Prior Publication Data

US 2016/0112527 A1    Apr. 21, 2016

Related U.S. Application Data

(63) Continuation of application No. PCT/CN2015/074000, filed on Mar. 11, 2015.

(30) Foreign Application Priority Data

Mar. 12, 2014  (CN) .......................... 2014 1 0091343

(51) Int. Cl.
*G06F 15/16* (2006.01)
*H04L 29/08* (2006.01)
(Continued)

(52) U.S. Cl.
CPC .............. *H04L 67/26* (2013.01); *G06N 7/005* (2013.01); *G06Q 10/00* (2013.01); *H04L 43/16* (2013.01);
(Continued)

(58) Field of Classification Search
CPC .......... H04L 67/26; H04L 43/16; H04L 29/08; H04L 12/26; G06N 7/005; G06N 7/00; G06Q 10/00; H04N 21/44008; H04N 21/4788
See application file for complete search history.

(56) References Cited

U.S. PATENT DOCUMENTS

| 8,750,602 B2 * | 6/2014 | Li ................................. 382/155 |
| 2003/0004966 A1 * | 1/2003 | Bolle ................. G06F 17/30253 |

(Continued)

FOREIGN PATENT DOCUMENTS

| CN | 102724168 A | 10/2012 |
| CN | 103116589 A | 5/2013 |
| JP | 2013015980 A | 1/2013 |

OTHER PUBLICATIONS

International Search Report for International Application No. PCT/CN2015/074000 mailed Jun. 11, 2015.
(Continued)

*Primary Examiner* — Cheikh Ndiaye
(74) *Attorney, Agent, or Firm* — Roger D. Emerson; Emerson, Thomson & Bennett, LLC

(57) ABSTRACT

The present disclosure discloses a multimedia file push method and apparatus, and relates to the field of network technologies. The method includes: obtaining first visual feature information, where the first visual feature information is visual feature information of a to-be-pushed multimedia file; determining a first user identity according to the first visual feature information, where the first user identity is a push target user identity of the to-be-pushed multimedia file; and pushing the to-be-pushed multimedia file according to the first user identity.

22 Claims, 6 Drawing Sheets

(51) Int. Cl.
    *G06N 7/00*      (2006.01)
    *H04L 12/26*     (2006.01)
    *G06Q 10/00*     (2012.01)
    *H04N 21/44*     (2011.01)
    *H04N 21/4788*   (2011.01)

(52) U.S. Cl.
    CPC ..... *H04N 21/44008* (2013.01); *H04N 21/4788* (2013.01)

(56)         References Cited

U.S. PATENT DOCUMENTS

| 2008/0219256 | A1  | 9/2008  | Tanaka |
| 2008/0288596 | A1* | 11/2008 | Smith ................... G06Q 30/02 709/206 |
| 2010/0312609 | A1* | 12/2010 | Epshtein ........... G06F 17/30867 705/14.58 |
| 2012/0117167 | A1  | 5/2012  | Sadja et al. |
| 2013/0046772 | A1* | 2/2013  | Gu .................... G06F 17/30029 707/751 |
| 2013/0094756 | A1* | 4/2013  | Li ......................... G06Q 30/00 382/155 |
| 2013/0124449 | A1* | 5/2013  | Pinckney .......... G06F 17/30867 706/52 |

OTHER PUBLICATIONS

Written Opinion for International Application No. PCT/CN2015/074000 mailed Jun. 11, 2015.

\* cited by examiner

MULTIMEDIA FILE PUSH METHOD AND APPARATUS

CROSS REFERENCE TO RELATED APPLICATION

This application is a continuation of International Application No. PCT/CN2015/074000, filed on Mar. 11, 2015, which claims priority to Chinese patent application No. 201410091343.3, filed on Mar. 12, 2014, the content of which are incorporated herein by reference in their entirety.

FIELD OF THE TECHNOLOGY

The present disclosure relates to the field of network technologies, and in particular, to a multimedia file push method and apparatus.

BACKGROUND OF THE DISCLOSURE

In the Internet age, when a user visits a social network, if a multimedia file that interests the user is pushed to the user, not only a visit click-through rate of the multimedia file is improved, but also influence of related products is further expanded; moreover, the user can perform operations, such as browsing and following related products, more easily, so as to improve user experience. Therefore, how to push a multimedia file to people accurately becomes a problem demanding prompt solution.

In the existing technology, when there is a newly-added multimedia file, a random push manner is usually used, that is: some users are selected randomly, the newly-added multimedia file is pushed to these users; and feedback information from the users is collected, all users in a social network that are interested in the newly-added multimedia file are determined according to the feedback information of the users, and the newly-added multimedia file is pushed to all the users in the social network that are interested in the newly-added multimedia file.

When a newly-added multimedia file is pushed to some users that are selected randomly, and if a small number of users are selected, feedback information of sufficient quantity cannot be collected; and when the multimedia file is pushed subsequently, push accuracy is relatively low.

SUMMARY

In order to solve the problem of the existing technology, embodiments of the present invention provide a multimedia file push method and apparatus. The technical solutions are as follows:

According to a first aspect, a multimedia file push method is provided, the method including:

obtaining first visual feature information, the first visual feature information being visual feature information of a to-be-pushed multimedia file;

determining a first user identity according to the first visual feature information, the first user identity being a push target user identity of the to-be-pushed multimedia file; and pushing the to-be-pushed multimedia file according to the first user identity.

According to a second aspect, a multimedia file push apparatus is provided, the apparatus including:

a visual feature information obtaining module, configured to obtain first visual feature information, the first visual feature information being visual feature information of a to-be-pushed multimedia file;

a user identity determining module, configured to determine a first user identity according to the first visual feature information, the first user identity being a push target user identity of the to-be-pushed multimedia file; and a push module, configured to push the to-be-pushed multimedia file according to the first user identity.

According to a third aspect, a multimedia file push method is provided, the method including:

obtaining, when a newly-registered user identity is detected, a user relation chain of the newly-registered user identity;

determining a multimedia file category corresponding to the newly-registered user identity according to the user relation chain;

determining a target multimedia file of the newly-registered user identity according to the multimedia file category; and pushing the target multimedia file.

According to a fourth aspect, a multimedia file push apparatus is provided, the apparatus including:

a user relation chain obtaining module, configured to obtain, when a newly-registered user identity is detected, a user relation chain of the newly-registered user identity;

a multimedia file category determining module, configured to determine a multimedia file category corresponding to the newly-registered user identity according to the user relation chain;

a target multimedia file determining module, configured to determine a target multimedia file of the newly-registered user identity according to the multimedia file category; and a push module, configured to push the target multimedia file.

The technical solutions provided in the embodiments of the present invention bring the following beneficial effects:

After visual feature information of a to-be-pushed multimedia file is obtained, a push target user identity of the to-be-pushed multimedia file is determined according to the visual feature information of the to-be-pushed multimedia file. Because before the to-be-pushed multimedia file is pushed, the push target user identity of the to-be-pushed multimedia file is determined according to the visual feature information that can reflect color features, shape features or detail features of the to-be-pushed multimedia file, probability that the to-be-pushed multimedia file is pushed to people that are interested in the multimedia file is greatly improved, and then push accuracy is improved.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

In order to make the technical solutions and advantages of the present disclosure clearer, implementation manners of the present disclosure are further described below in detail with reference to the accompanying drawings.

Figure 1:
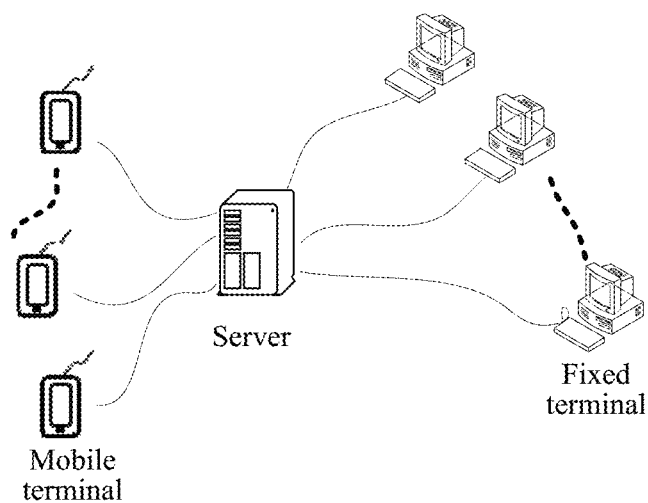
FIG. 1 is a schematic structural diagram of a multimedia file push system according to an embodiment of the present invention.
Figure 2:
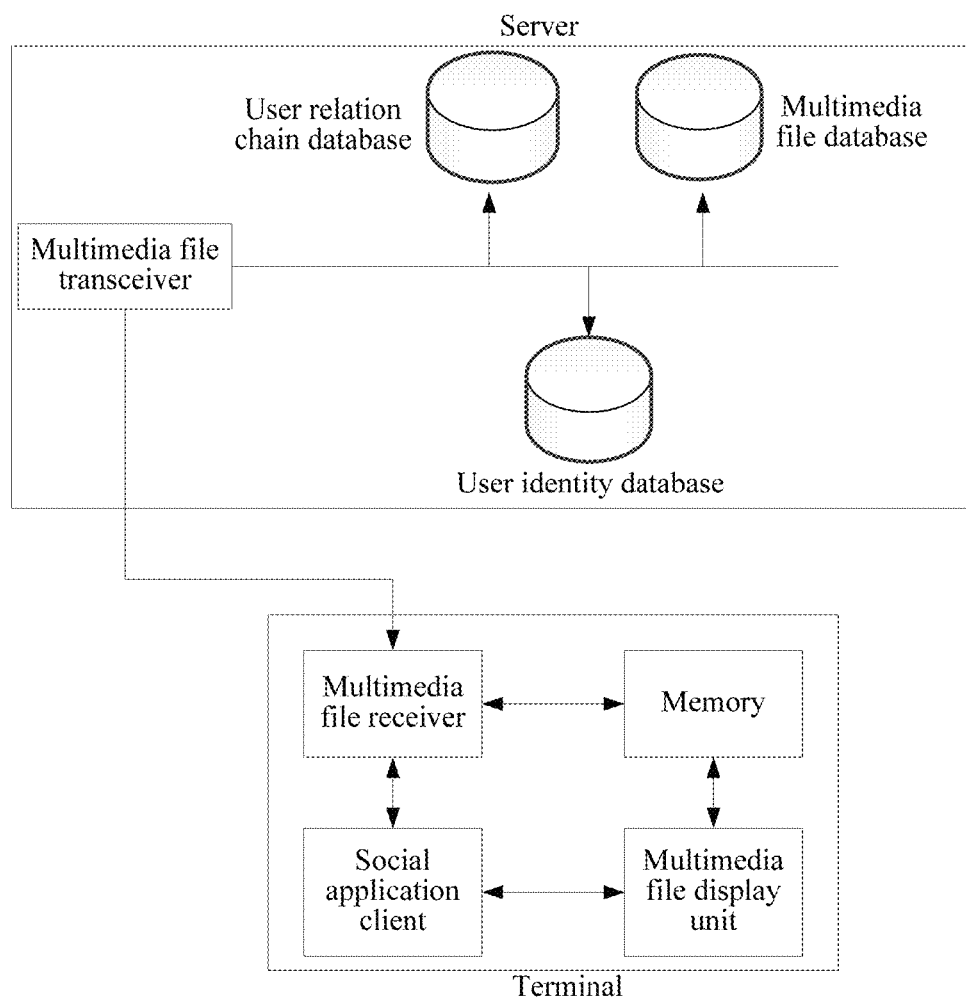
FIG. 2 is a schematic composition diagram of a multimedia file push system according to an embodiment of the present invention.

Before embodiments of the present invention are described in detail, an application scenario of the embodiments of the present invention is elaborated first. Referring to FIG. 1, a typical application scenario of the embodiments of the present invention is: when a new multimedia file is added to a server of a social network (a multimedia file deliverer uploads the multimedia file to the server of the social network), the server pushes the newly-added multimedia file to terminals corresponding to users that have registered with the social network and are interested in a to-be-pushed multimedia file. The terminals may include fixed terminals and mobile terminals, so as to achieve the objective, of the multimedia deliverer, of expanding influence of related products of the deliverer. However, in order to improve push accuracy of the to-be-pushed multimedia file, after obtaining visual feature information of the to-be-pushed multimedia file, the server determines a push target user identity of the to-be-pushed multimedia file according to the visual feature information of the to-be-pushed multimedia file, and then pushes the to-be-pushed multimedia file according to the push target user identity of the to-be-pushed multimedia file. Referring to FIG. 2 for a schematic composition diagram of a server, the server includes a multimedia file database, a user identity database, a user relation chain database, and a multimedia file transceiver. The multimedia file database is configured to store a newly-added multimedia file and a pushed multimedia file; the user identity database is configured to store each user identity that registers with a social network; the user relation chain database is configured to store a user relation chain of each user identity to maintain an association relationship between user identities; and the multimedia file transceiver is configured to receive a multimedia file uploaded by a multimedia file deliverer, or, push a multimedia file to a terminal. Referring to FIG. 2, the terminal may include a multimedia file receiver, a social application client, a memory and a multimedia file display unit. The multimedia file receiver is configured to receive a multimedia file; the social application client is used for transmitting messages with a server to each other; the memory is configured to store a received multimedia file; and the multimedia file display unit is configured to display the received multimedia file.

Figure 3:
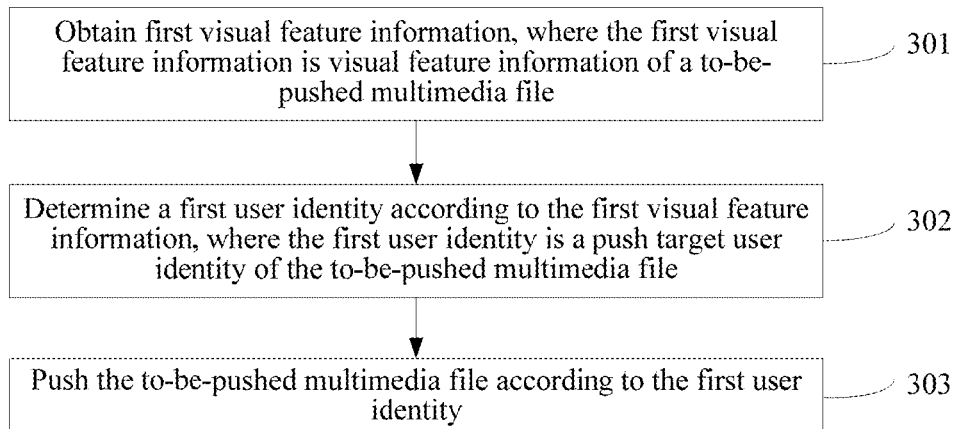
FIG. 3 is a flowchart of an information push method according to an embodiment of the present invention.

FIG. 3 is a flowchart of an information push method according to an embodiment of the present invention. Referring to FIG. 3, a process of the method provided in this embodiment includes:

301: Obtain first visual feature information, where the first visual feature information is visual feature information of a to-be-pushed multimedia file.

302: Determine a first user identity according to the first visual feature information, where the first user identity is a push target user identity of the to-be-pushed multimedia file.

303: Push the to-be-pushed multimedia file according to the first user identity.

In the method provided in this embodiment of the present invention, after visual feature information of a to-be-pushed multimedia file is obtained, a push target user identity of the to-be-pushed multimedia file is determined according to the visual feature information of the to-be-pushed multimedia file. Because before the to-be-pushed multimedia file is pushed, the push target user identity of the to-be-pushed multimedia file is determined according to the visual feature information that can reflect color features, shape features or detail features of the to-be-pushed multimedia file, probability that the to-be-pushed multimedia file is pushed to people that are interested in the multimedia file is greatly improved, and then push accuracy is improved.

Optionally, the visual feature information is at least one of pixel feature information, global feature information and detail feature information.

Optionally, determining a first user identity according to the first visual feature information includes:

determining a multimedia file that is similar to the to-be-pushed multimedia file according to the first visual feature information;

obtaining a second user identity according to a historical push process of the similar multimedia file, where the second user identity is a push target user identity of the similar multimedia file; and determining the first user identity according to the second user identity.

Optionally, determining a multimedia file that is similar to the to-be-pushed multimedia file according to the first visual feature information includes:

determining, for one pushed multimedia file among multiple pushed multimedia files, whether similarity between visual feature information of the pushed multimedia file and the first visual feature information is greater than a preset threshold; and determining the pushed multimedia file as the multimedia file that is similar to the to-be-pushed multimedia file if the similarity between the visual feature information of the pushed multimedia file and the first visual feature information is greater than the preset threshold.

Optionally, determining the first user identity according to the second user identity includes:

determining the second user identity as the first user identity; or determining a feedback user identity in the second user identity as the first user identity; or determining the second user identity and multiple user identities in a user relation chain of the second user identity as the first user identity.

Optionally, pushing the to-be-pushed multimedia file according to the first user identity includes:

determining a push user type corresponding to the to-be-pushed multimedia file according to the feedback user identity;

obtaining, from a correspondence between the push user type and a push user identity, the push user identity corresponding to the push user type; and pushing the to-be-pushed multimedia file according to the push user identity corresponding to the push user type.

Optionally, before determining a first user identity according to the first visual feature information, the method further includes:

obtaining second visual feature information and a third user identity, and establishing a push prediction model based on a correspondence between the second visual feature information and the third user identity, where the second visual feature information is visual feature information of each pushed multimedia file and the third user identity is a push target user identity of each pushed multimedia file; or obtaining second visual feature information and a fourth user identity, and establishing a push prediction model based on a correspondence between the second visual feature information and the fourth user identity, where the fourth user identity is a feedback user identity of each pushed multimedia file.

Optionally, determining a first user identity according to the first visual feature information includes:

searching, based on the push prediction model, for a push target user identity corresponding to the first visual feature information, and determining the found push target user identity as the first user identity.

Optionally, after determining a first user identity according to the first visual feature information, the method further includes:

pushing, when it is detected that a newly-registered user identity exists in a user relation chain of a registered user identity and if the registered user identity belongs to the first user identity, the to-be-pushed multimedia file according to the newly-registered user identity.

All foregoing optional technical solutions may be used in any combination thereof to form an optional embodiment of the present invention, which is not described herein again one by one.

Figure 4:
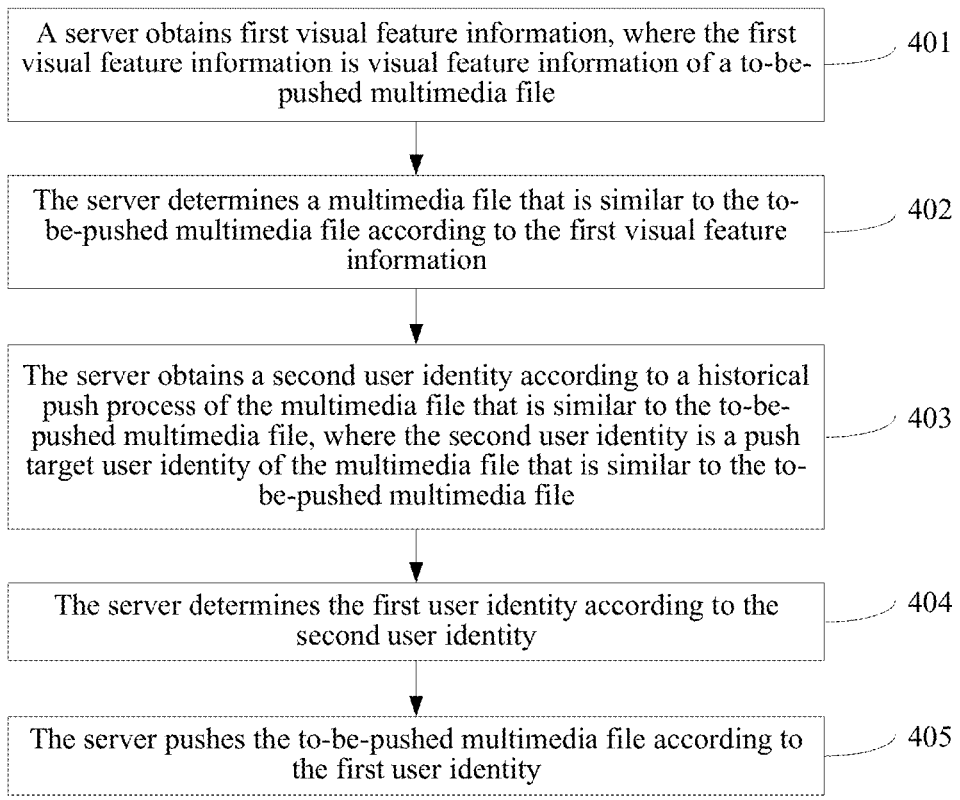
FIG. 4 is a flowchart of an information push method according to another embodiment of the present invention.

FIG. 4 is a flowchart of an information push method according to an embodiment of the present invention. Referring to FIG. 4, a process of the method provided in this embodiment includes:

401: A server obtains first visual feature information, where the first visual feature information is visual feature information of a to-be-pushed multimedia file.

The visual feature information may be at least one of pixel feature information, global feature information and detail feature information. The pixel feature information may be one or more of brightness information, saturation information, hue, naturalness information, contrast information, sharpness information, gray value simplicity, RGB simplicity, and HSV simplicity; the global feature information refers to gist feature information, which includes information of an image such as roughness, smoothness and contour; and detail feature information refers to an image hidden feature, and the image hidden feature may be extracted by using a deep neural network algorithm, and a human or an object in the image may be identified accurately by using the image hidden feature extracted through the deep neural network algorithm.

The server obtaining the visual feature information of the to-be-pushed multimedia file may be implemented by using an existing image feature extracting technology, which is not specifically limited in this embodiment. For example, when the visual feature information only includes the detail feature information, the detail feature information of the to-be-pushed multimedia file may be obtained by using the deep neural network algorithm.

402: The server determines a multimedia file that is similar to the to-be-pushed multimedia file according to the first visual feature information.

Thousands of pushed multimedia files are stored in a multimedia file library of the server, and these pushed multimedia files are of many types. If a multimedia file that is similar to the to-be-pushed multimedia file can be found in the pushed multimedia files, and the to-be-pushed multimedia file is pushed based on a push user identity of the similar multimedia file in a subsequent process, so that push accuracy is greatly improved. Determining a multimedia file that is similar to the to-be-pushed multimedia file according to the first visual feature information may use the following determining manner:

For one pushed multimedia file among multiple pushed multimedia files, it is determined whether similarity between visual feature information of the pushed multimedia file and the first visual feature information is greater than a preset threshold; and the pushed multimedia file is determined as the multimedia file that is similar to the to-be-pushed multimedia file if the similarity between the visual feature information of the pushed multimedia file and the first visual feature information is greater than the preset threshold.

A value of the preset threshold may specifically be 90%. Certainly, the value of the preset threshold may also be another numerical value except 90%, for example, 85% or 95%, and the value of the preset threshold is not specifically limited in this embodiment.

403: The server obtains a second user identity according to a historical push process of the multimedia file that is similar to the to-be-pushed multimedia file, where the second user identity is a push target user identity of the multimedia file that is similar to the to-be-pushed multimedia file.

In this embodiment, in a historical push process of a similar multimedia file, the server generates a push log of the similar multimedia file. The push log includes a push target user identity of the multimedia file, that is, records users that the similar multimedia file is pushed to. So, the second user identity may be obtained according to the push log, and the first user identity may further be obtained according to the second user identity, referring to the following step 404 for a detailed process.

Optionally, if it is determined in the foregoing step 402 that there are multiple multimedia files that are similar to the to-be-pushed multimedia file, when the second user identity is obtained, the second user identity may be obtained according to a historical push process of a multimedia file that is most similar to (has a largest similarity with) the to-be-pushed multimedia file; or, the second user identity is obtained according to historical push processes of all multimedia files that are similar to the to-be-pushed multimedia file, that is, the second user identity is obtained according to user push information of all similar multimedia files, and the second user identity includes push target user identities of all the similar multimedia files. To specifically use which one of the foregoing two obtaining manners is not specifically limited in this embodiment.

404: The server determines the first user identity according to the second user identity.

In this embodiment, the server determining the first user identity according to the second user identity may use the following three manners:

A first manner is determining the second user identity as the first user identity.

For the first manner, a principle for determining the first user identity is: users that the multimedia file that is similar to the to-be-pushed multimedia file is pushed to are push target users of the to-be-pushed multimedia file. For example, the multimedia file that is similar to the to-be-pushed multimedia file is pushed to 10 users with user identities being user A, user B, to user J respectively, and then the push target users of the to-be-pushed multimedia file are 10 users: user A, user B, to user J.

A second manner is determining a feedback user identity in the second user identity as the first user identity.

For the second manner, a principle for determining the first user identity is: for push users of the multimedia file that is similar to the to-be-pushed multimedia file, users whose feedback information is received by the server are push target users of the to-be-pushed multimedia file. For example, in 10 push users of the multimedia file that is similar to the to-be-pushed multimedia file, the server receives feedback information of 3 users with user identities being user A, user B and user C, and then the push target users of the to-be-pushed multimedia file are user A, user B and user C.

A third manner is determining the second user identity and multiple user identities in a user relation chain of the second user identity as the first user identity.

For the third manner, a principle for determining the first user identity is: for each registered user in a social network, each registered user has a user relation chain, and when a registered user is a push target user of the multimedia file that is similar to the to-be-pushed multimedia file, all registered users in a user relation chain of the registered user are determined as push target users of the to-be-pushed multimedia file.

405: The server pushes the to-be-pushed multimedia file according to the first user identity.

After determining the first user identity, the server may obtain each Internet Protocol (IP) address corresponding to the first user identity, and then push the to-be-pushed multimedia file to a terminal corresponding to each IP address. After receiving the multimedia file, the foregoing terminal can display the multimedia file at a preset area on a display interface of the terminal. Normally, the multimedia file is displayed at a lower-right corner area of the display interface of the terminal.

Optionally, after the first user identity is obtained according to the foregoing step 404, besides pushing the to-be-pushed multimedia file directly according to the first user identity, in order to improve push accuracy, another push manner is further provided in this embodiment. A specific process is as follows:

A push user type corresponding to the to-be-pushed multimedia file is determined according to the feedback user identity; a push user identity corresponding to the push user type is obtained from a correspondence between the push user type and a push user identity; and the to-be-pushed multimedia file is pushed according to the push user identity corresponding to the push user type.

The push user type may be divided according to gender, for example, divided into a male user type and a female user type; may also be divided according to age, for example, divided into a user type from 10 years old to 20 years old, a user type from 20 years old to 30 years old, a user type from 30 years old to 40 years old, or the like; and may also be divided according to occupation, for example, divided into a white-collar user type, a housewife user type, a teacher user type, a doctor user type, or the like. A dividing manner of the push user type is not specifically limited in this embodiment.

When the push user type corresponding to the to-be-pushed multimedia file is determined according to the feedback user identity, because a user of a social network fills in personal information that includes age, gender and occupation when registering, gender information, age information, occupation information, or the like corresponding to the feedback user identity may be determined according to the personal information filled in. The number of user identities corresponding to different genders, the number of user identities corresponding to different age periods and the number of user identities corresponding to different occupation types may be obtained by making statistics on age information or occupation information corresponding to each user identity in the feedback user identity. If the push user type is divided according to gender, a gender user type that has the largest number of user identities is determined as the push user type corresponding to the to-be-pushed multimedia file; if the push user type is divided according to age, an age user type that has the number of user identities that ranks in top preset number of bits is determined as the push user type corresponding to the to-be-pushed multimedia file; and if the push user type is divided according to occupation, an occupation user type that has the number of user identities that ranks in top few places is determined as the push user type corresponding to the to-be-pushed multimedia file.

In addition, because a user of a social network fills in personal information that includes age, gender and occupation when registering, a correspondence between the push user type and the push user identity may be obtained by analyzing the user identity and the personal information. Therefore, after the push user type corresponding to the to-be-pushed multimedia file is determined, the push user identity corresponding to the push user type may be obtained, and then the to-be-pushed multimedia file is pushed according to the push user identity. For example, if in the feedback user identity, user identities corresponding to female users are far more than user identities corresponding to male users, when the to-be-pushed multimedia file is pushed, the female users may be regarded as the push target user. User identities corresponding to all female users are determined in all registered user identities of the social network, and the to-be-pushed multimedia file is pushed according to the user identities corresponding to all female users.

Figure 5:
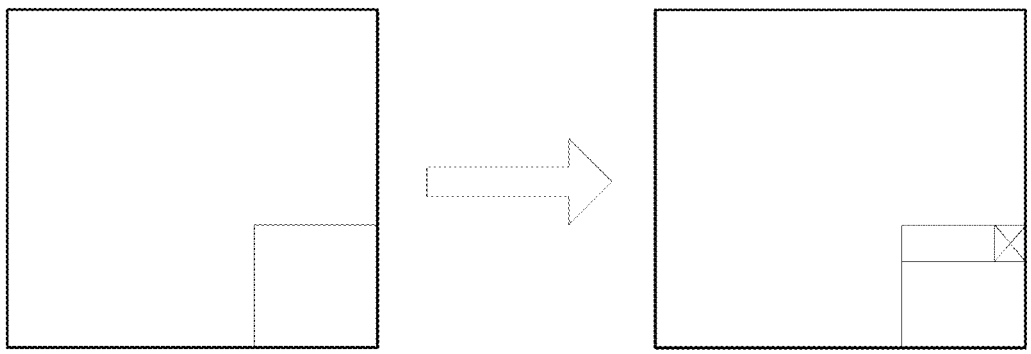
FIG. 5 is a schematic diagram of a closable floating layer according to another embodiment of the present invention.

It should be noted that after the to-be-pushed multimedia file is pushed, a floating layer closing function is further provided. That is, after the to-be-pushed multimedia file is pushed to a user terminal, if a user is not interested in the multimedia file, when a terminal pointer is located at an area where the to-be-pushed multimedia file is located, a closable floating layer shown in FIG. 5 appears in a preset area of the area where the to-be-pushed multimedia file is located. When the user clicks a close button of the closable floating layer, the pushed multimedia file is hidden automatically, so as to prevent the pushed multimedia file from disturbing the user and reducing user experience.

In the method provided in this embodiment of the present invention, after visual feature information of a to-be-pushed multimedia file is obtained, a push target user identity of the to-be-pushed multimedia file is determined according to the visual feature information of the to-be-pushed multimedia file and visual feature information of a multimedia file that is similar to the to-be-pushed multimedia file, and further according to a push target user identity of the similar multimedia file. Because before the to-be-pushed multimedia file is pushed, the push target user identity of the to-be-pushed multimedia file is predicted according to the push target user identity of the similar multimedia file, probability that the to-be-pushed multimedia file is pushed to people that are interested in the multimedia file is greatly improved, and then push accuracy is improved.

Figure 6:
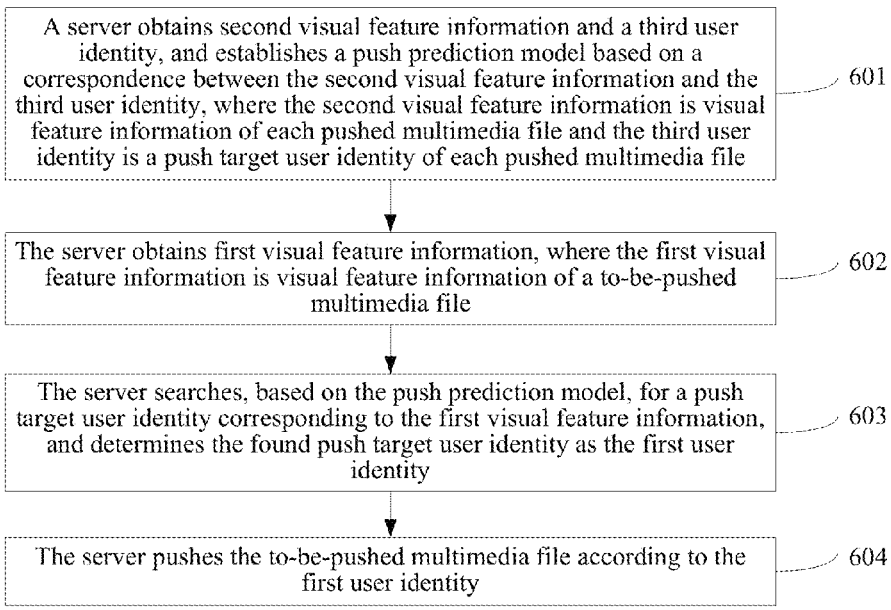
FIG. 6 is a flowchart of an information push method according to another embodiment of the present invention.

In the embodiment shown in FIG. 4, a push target user identity of a currently to-be-pushed multimedia file is determined from push objects of a similar multimedia file. However, in order to determine an internal relation between a multimedia file and a push user identity, such as which type of users likes a multimedia file that has a certain kind of visual feature information, the push target user identity of the to-be-pushed multimedia file may be determined by modeling a historical push process. FIG. 6 is a flowchart of an information push method according to an embodiment of the present invention. Referring to FIG. 6, a process of the method provided in this embodiment includes:

601: A server obtains second visual feature information and a third user identity, and establishes a push prediction model based on a correspondence between the second visual feature information and the third user identity, where the second visual feature information is visual feature information of each pushed multimedia file and the third user identity is a push target user identity of each pushed multimedia file.

When the push prediction model is established, a machine self-learning method may be used. Because larger a sample size is, more accurate the established push prediction model is, all pushed multimedia files stored in a multimedia file library of the server need to be used for modeling. During a specific modeling process, the second visual feature information and the third user identity are obtained first, and then the correspondence between the second visual feature information and the third user identity is summarized to obtain a correspondence between visual feature information and a user identity, so as to implement that when one piece of visual feature information is input, a push target user identity corresponding to the visual feature information is output. A basic principle of modeling is: because the visual feature information may reflect color features, shape features and detail texture features of an image, cluster analysis is performed on each piece of visual feature information, so that it can be summarized that which type of push user identity corresponds to the visual feature information that has a certain kind of color features, shape features or detail features, that is, which type of user is interested in a multimedia file that has a certain kind of visual feature information. Using pixel feature information of the visual feature information as an example, visual feature information that has large contrast, dense color changes and many different kinds of colors most likely corresponds to young users, that is, the young users are interested in a multimedia file that has color impact; while visual feature information that has sparse color changes, small contrast and few different kinds of colors most likely corresponds to aged users, that is, the aged users are interested in a multimedia file that has pain color and small color transition.

After the push prediction model is established, when there is a to-be-pushed multimedia file subsequently, visual feature information of the to-be-pushed multimedia file is obtained. The visual feature information of the to-be-pushed multimedia file is input into the established push prediction model, and then a push target user identity of the to-be-pushed multimedia file can be obtained automatically. Because a machine self-learning manner is used and has a strong adaptability, and with the gradual expansion of a sample set, setup precision becomes increasingly higher, so that multimedia file push accuracy is greatly improved correspondingly.

It should be noted that when the method provided in this embodiment is executed, the foregoing step 601 does not need to be performed every time. After newly-added pushed multimedia files in a multimedia file library reach a preset number, a process of reestablishing the push prediction model may be performed once to improve setup precision of the model, so as to improve push accuracy of the multimedia file.

602: The server obtains first visual feature information, where the first visual feature information is visual feature information of a to-be-pushed multimedia file.

This step is similar to the foregoing step 401, and is not described herein again.

603: The server searches, based on the push prediction model, for a push target user identity corresponding to the first visual feature information, and determines a found push target user identity as the first user identity.

Because the push prediction model is established in step 601, when the first visual feature information is input into the push prediction model, the server may search, according to the first visual feature information and from a correspondence, between visual feature information and a user identity, in the push prediction model, for a correspondence entry corresponding to the first visual feature information, to obtain the push target user identity corresponding to the first visual feature information, and the push target user identity is the first user identity.

604: The server pushes the to-be-pushed multimedia file according to the first user identity.

This step is similar to the foregoing step 405, and is not described herein again.

It should be noted that after the to-be-pushed multimedia file is pushed, a floating layer closing function is further provided. That is, after the to-be-pushed multimedia file is pushed to a user terminal, if a user is not interested in the multimedia file, when a terminal pointer is located at an area where the to-be-pushed multimedia file is located, a closable floating layer shown in FIG. 5 appears in a preset area of the area where the to-be-pushed multimedia file is located. When the user clicks a close button of the closable floating layer, the pushed multimedia file is hidden automatically, so as to prevent the pushed multimedia file from disturbing the user and reducing user experience.

In the method provided in this embodiment of the present invention, after a push prediction model is established according to visual feature information and push target user identities of pushed multimedia files, when visual feature information of a to-be-pushed multimedia file is obtained, a push target user identity corresponding to the visual feature information of the to-be-pushed multimedia file is obtained based on the push prediction model. Because before the to-be-pushed multimedia file is pushed, the push target user identity of the to-be-pushed multimedia file is determined according to the visual feature information of the to-be-pushed multimedia file, probability that the to-be-pushed multimedia file is pushed to people that are interested in the multimedia file is greatly improved, and then push accuracy is improved.

Figure 7:
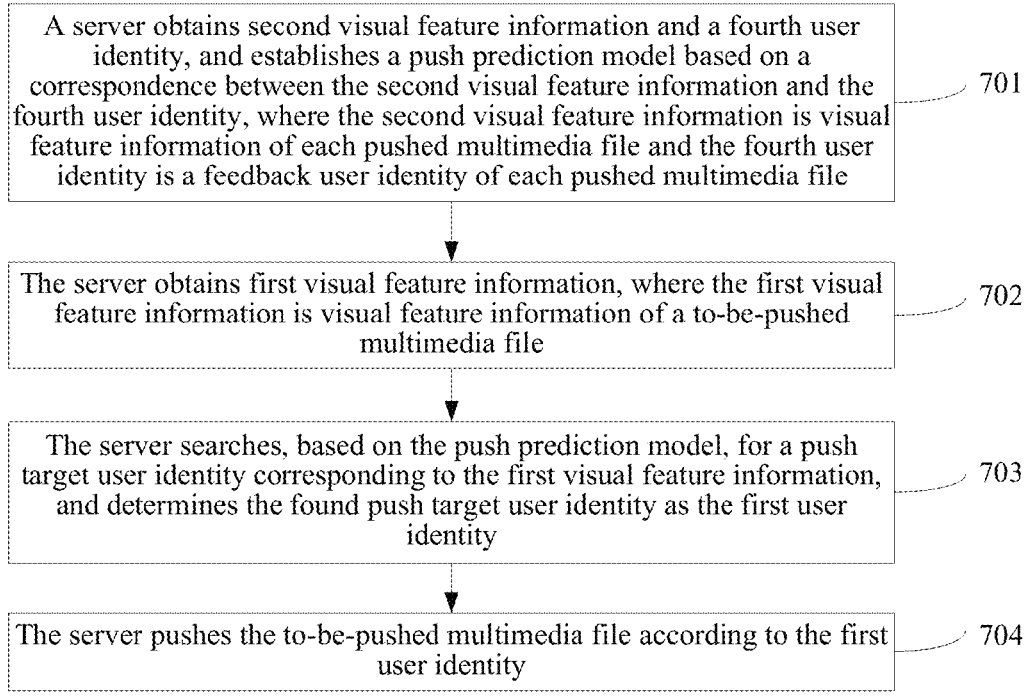
FIG. 7 is a flowchart of an information push method according to another embodiment of the present invention.

In the embodiment shown in FIG. 6, modeling is performed based on push target user identities of pushed multimedia files during a historical push process. In order to further improve multimedia file push accuracy, in this embodiment, a push prediction model is established according to feedback user identities of the pushed multimedia files, so that a push target user identity of a to-be-pushed multimedia file is determined. FIG. 7 is a flowchart of an information push method according to an embodiment of the present invention. Referring to FIG. 7, a process of the method provided in this embodiment includes:

701: A server obtains second visual feature information and a fourth user identity, and establishes a push prediction model based on a correspondence between the second visual feature information and the fourth user identity, where the second visual feature information is visual feature information of each pushed multimedia file and the fourth user identity is a feedback user identity of each pushed multimedia file.

In this embodiment, in order to determine more accurately target push people of a to-be-pushed multimedia file, and prevent a case in which a user receives a multimedia file that does not interest the user, causing the user feel harassed and reducing user experience. In this embodiment, the push prediction model is established according to the fourth user identity and the second visual feature information. For a pushed multimedia file, a feedback user identity refers to a user identity, in a push target user identity of the pushed multimedia file, that performs information feedback. For a push target user, when the user performs information feedback on a pushed multimedia file, it indicates that the user is interested in the multimedia file.

When the push prediction model is established, a machine self-learning method may be used. Because larger a sample size is, more accurate the established push prediction model is, all pushed multimedia files stored in a multimedia file library of the server need to be used for modeling. During a specific modeling process, the second visual feature information and the fourth user identity are obtained first, and then the correspondence between the second visual feature information and the fourth user identity is summarized to obtain a correspondence between visual feature information and a user identity, so as to implement that when one piece of visual feature information is input, a push target user identity corresponding to the visual feature information is output. A basic principle of modeling is: because the visual feature information may reflect color features, shape features and detail texture features of an image, cluster analysis is performed on each piece of visual feature information, so that it can be summarized that which type of push user identity corresponds to the visual feature information that has a certain kind of color features, shape features or detail features, that is, which type of user is interested in a multimedia file that has a certain kind of visual feature information. Using pixel feature information of the visual feature information as an example, visual feature information that has large contrast, dense color changes and many different kinds of colors most likely corresponds to young users, that is, the young users are interested in a multimedia file that has color impact; while visual feature information that has sparse color changes, small contrast and few different kinds of colors most likely corresponds to aged users, that is, the aged users are interested in a multimedia file that has pain color and small color transition.

After the push prediction model is established, when there is a to-be-pushed multimedia file subsequently, visual feature information of the to-be-pushed multimedia file is obtained. The visual feature information of the to-be-pushed multimedia file is input into the established push prediction model, and then a push target user identity of the to-be-pushed multimedia file can be obtained automatically. Because a machine self-learning manner is used and has a strong adaptability, and with the gradual expansion of a sample set, setup precision becomes increasingly higher, so that multimedia file push accuracy is greatly improved correspondingly.

It should be noted that when the method provided in this embodiment is executed, the foregoing step 701 does not need to be performed every time. After newly-added pushed multimedia files in a multimedia file library reach a preset number, a process of reestablishing the push prediction model may be performed once to improve setup precision of the model, so as to improve push accuracy of the multimedia file.

702: The server obtains first visual feature information, where the first visual feature information is visual feature information of a to-be-pushed multimedia file.

This step is similar to the foregoing step 401, and is not described herein again.

703: The server searches, based on the push prediction model, for a push target user identity corresponding to the first visual feature information, and determines a found push target user identity as the first user identity.

Because the push prediction model is established in step 701, when the first visual feature information is input into the push prediction model, the server may search, according to the first visual feature information and from a correspondence, between visual feature information and a user identity, in the push prediction model, for a correspondence entry corresponding to the first visual feature information, to obtain the push target user identity corresponding to the first visual feature information, and the push target user identity is the first user identity.

704: The server pushes the to-be-pushed multimedia file according to the first user identity.

This step is similar to the foregoing step 405, and is not described herein again.

It should be noted that after the to-be-pushed multimedia file is pushed, a floating layer closing function is further provided. That is, after the to-be-pushed multimedia file is pushed to a user terminal, if a user is not interested in the multimedia file, when a terminal pointer is located at an area where the to-be-pushed multimedia file is located, a closable floating layer shown in FIG. 5 appears in a preset area of the area where the to-be-pushed multimedia file is located. When the user clicks a close button of the closable floating layer, the pushed multimedia file is hidden automatically, so as to prevent the pushed multimedia file from disturbing the user and reducing user experience.

In the method provided in this embodiment of the present invention, after a push prediction model is established according to visual feature information and feedback user identities of pushed multimedia files, when visual feature information of a to-be-pushed multimedia file is obtained, a push target user identity corresponding to the visual feature information of the to-be-pushed multimedia file is obtained based on the push prediction model. Because before the to-be-pushed multimedia file is pushed, the push target user identity of the to-be-pushed multimedia file is determined according to the visual feature information of the to-be-pushed multimedia file, probability that the to-be-pushed multimedia file is pushed to people that are interested in the multimedia file is greatly improved, and then push accuracy is improved.

Figure 8:
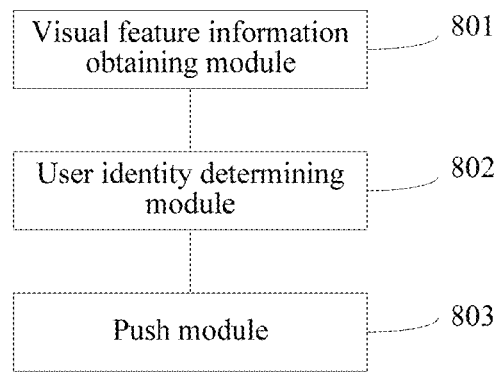
FIG. 8 is a schematic structural diagram of an information push apparatus according to another embodiment of the present invention.

FIG. 8 is a schematic diagram of an information push apparatus according to an embodiment of the present invention. Referring to FIG. 8, the apparatus provided in this embodiment includes: a visual feature information obtaining module 801, a user identity determining module 802, and a push module 803.

The visual feature information obtaining module 801 is configured to obtain first visual feature information, where the first visual feature information is visual feature information of a to-be-pushed multimedia file; the user identity determining module 802 is configured to determine a first user identity according to the first visual feature information, where the first user identity is a push target user identity of the to-be-pushed multimedia file; and the push module 803 is configured to push the to-be-pushed multimedia file according to the first user identity.

Optionally, the visual feature information obtaining module includes:

a multimedia file determining unit, configured to determine a multimedia file that is similar to the to-be-pushed multimedia file according to the first visual feature information;

a user identity obtaining unit, configured to obtain a second user identity according to a historical push process of the similar multimedia file, where the second user identity is a push target user identity of the similar multimedia file; and a user identity determining unit, configured to determine the first user identity according to the second user identity.

Optionally, the multimedia file determining unit is configured to: determine, for one pushed multimedia file among multiple pushed multimedia files, whether similarity between visual feature information of the pushed multimedia file and the first visual feature information is greater than a preset threshold; and determine the pushed multimedia file as the multimedia file that is similar to the to-be-pushed multimedia file if the similarity between the visual feature information of the pushed multimedia file and the first visual feature information is greater than the preset threshold.

Optionally, the user identity determining unit is configured to: determine the second user identity as the first user identity; or, determine a feedback user identity in the second user identity as the first user identity; or, determine the second user identity and multiple user identities in a user relation chain of the second user identity as the first user identity.

Optionally, the push module is configured to: determine a push user type corresponding to the to-be-pushed multimedia file according to the feedback user identity; obtain, from a correspondence between the push user type and a push user identity, the push user identity corresponding to the push user type; and push the to-be-pushed multimedia file according to the push user identity corresponding to the push user type.

Optionally, the apparatus further includes:

a push prediction model establishing module, configured to: obtain second visual feature information and a third user identity, and establish a push prediction model based on a correspondence between the second visual feature information and the third user identity, where the second visual feature information is visual feature information of each pushed multimedia file and the third user identity is a push target user identity of each pushed multimedia file; or, obtain the second visual feature information and a fourth user identity, and establish a push prediction model based on a correspondence between the second visual feature information and the fourth user identity, where the fourth user identity is a feedback user identity of each pushed multimedia file.

Optionally, the user identity determining module is configured to search, based on the push prediction model, for a push target user identity corresponding to the first visual feature information, and determine the found push target user identity as the first user identity.

Optionally, the push module is further configured to push, when it is detected that a newly-registered user identity exists in a user relation chain of a registered user identity and if the registered user identity belongs to the first user identity, the to-be-pushed multimedia file according to the newly-registered user identity.

In the apparatus provided in this embodiment of the present invention, after visual feature information of a to-be-pushed multimedia file is obtained, a push target user identity of the to-be-pushed multimedia file is determined according to the visual feature information of the to-be-pushed multimedia file. Because before the to-be-pushed multimedia file is pushed, the push target user identity of the to-be-pushed multimedia file is determined according to the visual feature information that can reflect color features, shape features or detail features of the to-be-pushed multimedia file, probability that the to-be-pushed multimedia file is pushed to people that are interested in the multimedia file is greatly improved, and then push accuracy is improved.

It should be noted that a push process for a newly-added multimedia file is elaborated in the foregoing several embodiments. Further, for a newly-registered user in a social network, because a multimedia file category that interests a newly-registered user is unknown, how to push a multimedia file to a newly-registered user is also a problem that needs to be solved. The following several embodiments give a specific implementation manner for pushing a multimedia file to a newly-registered user.

Figure 9:
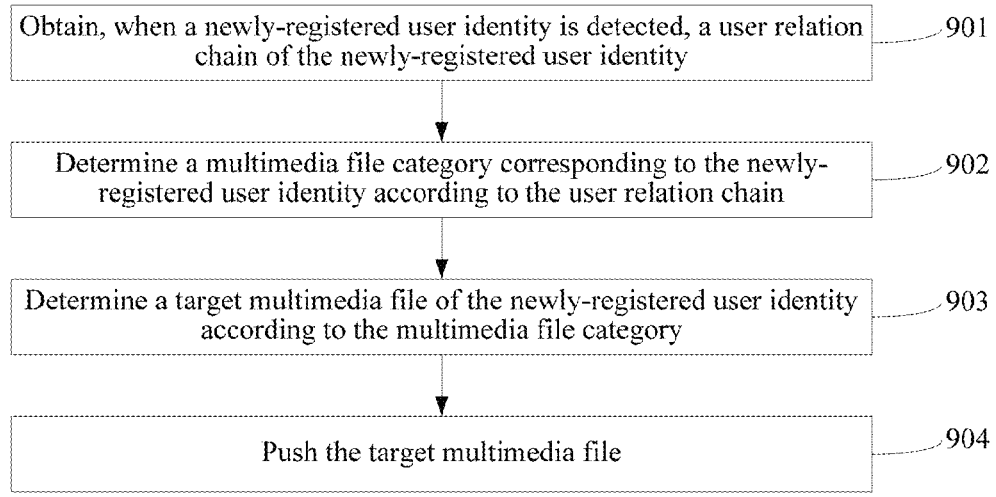
FIG. 9 is a flowchart of an information push method according to another embodiment of the present invention.

FIG. 9 is a flowchart of an information push method according to an embodiment of the present invention. Referring to FIG. 9, a process of the method provided in this embodiment includes:

901: Obtain, when a newly-registered user identity is detected, a user relation chain of the newly-registered user identity.

902: Determine a multimedia file category corresponding to the newly-registered user identity according to the user relation chain.

903: Determine a target multimedia file of the newly-registered user identity according to the multimedia file category.

904: Push the target multimedia file.

In the method provided in this embodiment, when a newly-registered user identity is detected, a multimedia file category corresponding to the newly-registered user identity is determined based on a user relation chain of the newly-registered user identity, and then a multimedia file is pushed to the newly-registered user identity according to the multimedia file category. Because the multimedia file category that interests the newly-registered user identity is determined, the multimedia file can be pushed to a targeted newly-registered user, thereby improving push accuracy of the multimedia file.

Optionally, determining a multimedia file category corresponding to the newly-registered user identity according to the user relation chain includes:

determining a reference user identity in the user relation chain, where the reference user identity is a registered user identity that has a frequency of interaction with the newly-registered user identity greater than a preset threshold; and determining, according to a multimedia file category corresponding to the reference user identity, the multimedia file category corresponding to the newly-registered user identity.

Optionally, determining, according to a multimedia file category corresponding to the reference user identity, the multimedia file category corresponding to the newly-registered user identity includes:

determining, if there is one reference user identity, a multimedia file category corresponding to the registered user identity as the multimedia file category corresponding to the newly-registered user identity; or determining, if there are multiple reference user identities, a multimedia file category corresponding to a reference user identity that has the highest frequency of interaction with the newly-registered user identity as the multimedia file category corresponding to the newly-registered user identity.

Optionally, determining a multimedia file category corresponding to the newly-registered user identity according to the user relation chain includes:

making statistics, according to a multimedia file category corresponding to each registered user identity in the user relation chain, on the number of registered user identities corresponding to each multimedia file category; and determining a multimedia file category that has most registered user identities as the multimedia file category corresponding to the newly-registered user identity.

Optionally, the frequency of interaction is at least one of a mutual commenting frequency, a message sending frequency, a conversation frequency and a personal page visiting frequency.

All foregoing optional technical solutions can be used in any combination thereof to form an optional embodiment of the present invention, which is not described herein again one by one.

Figure 10:
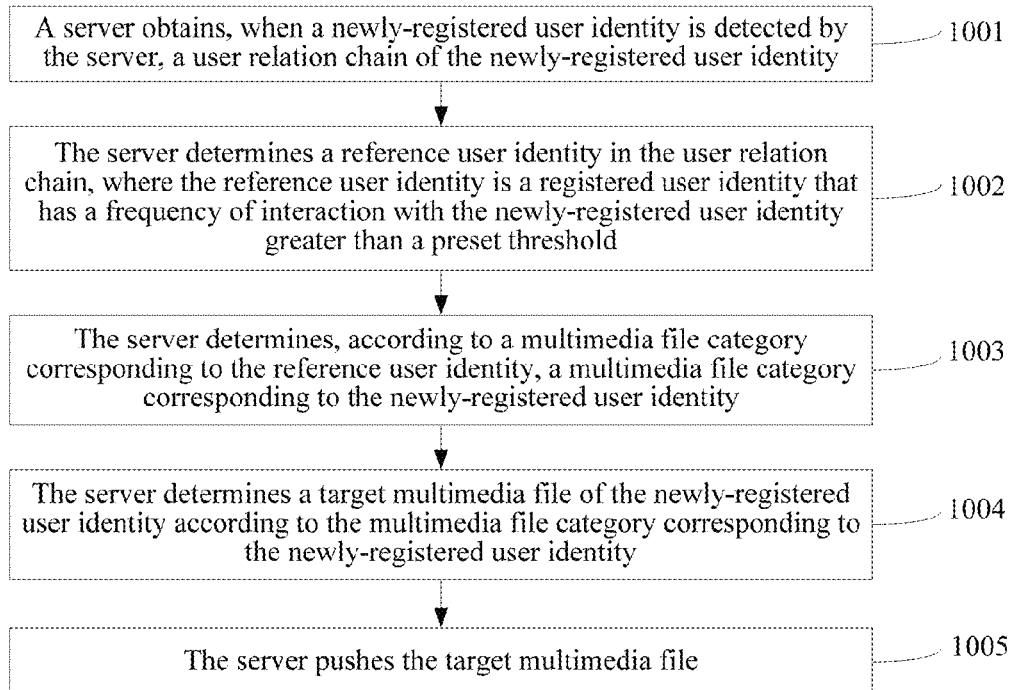
FIG. 10 is a flowchart of an information push method according to another embodiment of the present invention.

FIG. 10 is a flowchart of an information push method according to an embodiment of the present invention. Referring to FIG. 10, a process of the method provided in this embodiment includes:

1001: A server obtains, when a newly-registered user identity is detected by the server, a user relation chain of the newly-registered user identity.

In this embodiment, the server may scan in real time that whether there is a newly-registered user identity a social network, or detect for a preset time interval that whether there is a newly-registered user identity a social network, and a specific detection manner is not specifically limited in this embodiment.

Because a main objective for a user to register with a social network is to communicate and exchange with other people, every registered user identity in the social network has a user relation chain corresponding to the registered user identity. A correspondence between a user identity and a user relation chain and the user relation chain are both stored in the server. So, when a newly-registered user identity is detected, a user relation chain corresponding to the newly-registered user identity can be obtained from a user relation chain database according to the newly-registered user identity. The user relation chain includes one or more newly-registered or one or more registered user identities.

1002: The server determines a reference user identity in the user relation chain, where the reference user identity is a registered user identity that has a frequency of interaction with the newly-registered user identity, greater than a preset threshold.

For one newly-registered user identity, users corresponding to multiple user identities in a user relation chain of the newly-registered user identity may include relatives, colleagues, friends, strangers, and the like, of the newly-registered user identity. Moreover, because the foregoing four kinds of people have different intimate levels with a user corresponding to the newly-registered user identity, the foregoing four kinds of people have different frequencies of interaction with the newly-registered user. In order to accurately predict a multimedia file category corresponding to the newly-registered user identity, the reference user identity needs to be determined in a relation chain of the newly-registered user identity, so that multimedia file push is performed subsequently.

Optionally, when the server determines the reference user identity in the user relation chain, statistics may be made on the frequency of interaction that each user identity in the user relation chain has with the newly-registered user identity during a preset time period, and the registered user identity, in the user relation chain, that has a frequency of interaction greater than the preset threshold is determined as the reference user identity. The preset time period may be a last week, a last month, and so on. A length of the preset time period is not specifically limited in this embodiment.

The frequency of interaction is at least one of mutual commenting frequency, message sending frequency, conversation frequency and personal page visiting frequency. The mutual commenting frequency may refer to mutual commenting frequency of a personalized signature, mutual commenting frequency of a personalized avatar, and so on; the message sending frequency may refer to mutual message leaving frequency, mutual direct messaging frequency, and so on; and the conversation frequency refer to real-time conversation frequency of two parties, offline conversation frequency of two parties, and so on. A form of the frequency of interaction may be *times/*day, *times/*month, *times/*week, and so on, and the form of the frequency of interaction is not specifically limited in this embodiment.

Optionally, when the frequency of interaction includes multiple frequencies in mutual commenting frequency, message sending frequency, conversation frequency and personal page visiting frequency, an average value of the multiple frequencies may be taken, and then the average value is compared with the preset threshold. Certainly, the largest one in the multiple frequencies may also be compared with the preset threshold. Weight may also be set for the multiple frequencies, and frequency to be compared with the preset threshold is chosen according to a weight value of each frequency. A specific comparison manner is not specifically limited in this embodiment. One possible implementation manner is given herein only.

1003: The server determines, according to a multimedia file category corresponding to the reference user identity, a multimedia file category corresponding to the newly-registered user identity.

The multimedia file category may be divided into menswear, womenswear, childrenswear, food, fashion, travel, automobile, maternal and child supplies, book, film, television, and so on.

Because all reference user identities are registered user identities, a large number of pushed multimedia files may be received by a reference user identity during a historical period, and the multimedia file category corresponding to the reference user identity is made clear according to feedback information of the reference user identity, that is, the multimedia file category that interests a reference user is made clear, the multimedia file category corresponding to the newly-registered user identity may be determined according to the multimedia file category corresponding to the reference user identity. A specific determining manner is as follows:

A first manner is determining, if there is one reference user identity, a multimedia file category corresponding to the registered user identity as the multimedia file category corresponding to the newly-registered user identity.

For the first manner, when there is only one reference user identity in the user relation chain, a multimedia file category corresponding to the reference user identity is the multimedia file category corresponding to the newly-registered user identity. For example, the multimedia file category corresponding to the reference user identity is womenswear and food, and then the multimedia file category corresponding to the newly-registered user identity is womenswear and food.

A second manner is determining, if there are multiple reference user identities, a multimedia file category corresponding to a reference user identity that has largest frequency of interaction with the newly-registered user identity as the multimedia file category corresponding to the newly-registered user identity.

For the second manner, if the reference user identity that has the highest frequency of interaction is also more than one, a multimedia file category corresponding to each reference user identity is regarded as the multimedia file category corresponding to the newly-registered user identity. For example, the frequencies of interaction of user A and user B with the newly-registered user identity are the same and are both the largest frequency of interaction in the user relation chain. A multimedia file category corresponding to the user A is automobile and a multimedia file category corresponding to the user B is travel, and then the multimedia file category corresponding to the newly-registered user identity is automobile and travel.

1004: The server determines a target multimedia file of the newly-registered user identity according to the multimedia file category corresponding to the newly-registered user identity.

In this embodiment, the server prestores a correspondence between a multimedia file category and a multimedia file, the correspondence between a multimedia file category and a multimedia file is searched according to the multimedia file category corresponding to the newly-registered user identity, and one or more multimedia files under the multimedia file category corresponding to the newly-registered user identity may be obtained directly. For one example, if the multimedia file category is womenswear, multimedia files such as "hot sale spring womenswear", and "popular Korean style spring clothes" may be included under the category. Because there may be a large number of multimedia files under the multimedia file category corresponding to the newly-registered user identity, when the target multimedia file of the newly-registered user identity is determined, a multimedia file, under the category, that receives most user feedback may be determined as the target multimedia file of the newly-registered user. Certainly, the target multimedia file of the newly-registered user identity may also be chosen randomly under the category, and is not specifically limited in this embodiment.

1005: The server pushes the target multimedia file.

After the server determines the target multimedia file, the server may obtain an IP address corresponding to the newly-registered user identity, and then push the to-be-pushed multimedia file to a terminal (newly-registered user terminal) corresponding to the IP address. After receiving the multimedia file, the foregoing terminal can display the multimedia file on a preset area on a display interface of the terminal. Normally, the multimedia file is displayed at a lower-right corner area of the display interface of the terminal.

It should be noted that after the to-be-pushed multimedia file is pushed, a floating layer closing function is further provided. That is, after the to-be-pushed multimedia file is pushed to a user terminal, if a user is not interested in the multimedia file, when a terminal pointer is located at an area where the to-be-pushed multimedia file is located, a closable floating layer shown in FIG. 5 appears in a preset area of the area where the to-be-pushed multimedia file is located. When the user clicks a close button of the closable floating layer, the pushed multimedia file is hidden automatically, so as to prevent the pushed multimedia file from disturbing the user and reducing user experience.

In the method provided in this embodiment, when a newly-registered user identity is detected, a multimedia file category corresponding to the newly-registered user identity is determined based on a user relation chain of the newly-registered user identity, and then a multimedia file is pushed to the newly-registered user identity according to the multimedia file category. Because the multimedia file category that interests the newly-registered user identity is determined, the multimedia file can be pushed to a targeted newly-registered user, thereby improving push accuracy of the multimedia file.

Figure 11:
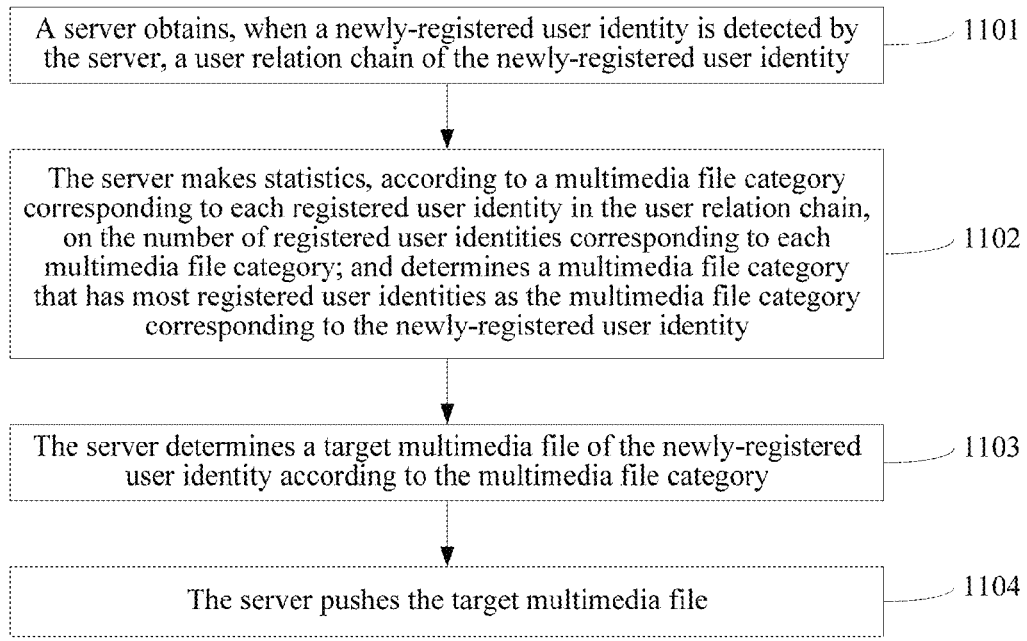
FIG. 11 is a flowchart of an information push method according to another embodiment of the present invention.

FIG. 11 is a flowchart of an information push method according to an embodiment of the present invention. Referring to FIG. 11, a process of the method provided in this embodiment includes:

1101: A server obtains, when a newly-registered user identity is detected by the server, a user relation chain of the newly-registered user identity.

This step is similar to step 1001, and is not described herein again.

1102: The server makes statistics, according to a multimedia file category corresponding to each registered user identity in the user relation chain, on the number of registered user identities corresponding to each multimedia file category; and determines a multimedia file category that has most registered user identities as a multimedia file category corresponding to the newly-registered user identity.

There may be one or more multimedia file categories corresponding to each registered user identity. Different registered users may correspond to a same multimedia file category.

This step is explained and described below in detail with a specific example.

Assuming that there are 5 registered users in the user relation chain of the newly-registered user identity, the 5 registered users are identified with symbols A to E separately, a multimedia file category corresponding to a user A is maternal and child supplies, a multimedia file category corresponding to a user B is travel, a multimedia file category corresponding to a user C is maternal and child supplies, a multimedia file category corresponding to a user D is food, and a multimedia file category corresponding to a user E is womenswear, when statistics is made on the number of registered user identities corresponding to each multimedia file category, a statistical table shown in the following table 1 may be established:

TABLE 1

| Multimedia file category | Registered user identity |
|---|---|
| Maternal and child supplies | User A, user C |
| Travel | User B |
| Food | User D |
| Womenswear | User E |

As can be seen from the above table 1 that the number of registered user identities corresponding to maternal and child supplies is 2, is greater than the number of registered user identities corresponding to food and the number of registered user identities corresponding to womenswear, and is the multimedia file category that has the most registered user identities. Therefore maternal and child supplies are determined as the multimedia file category corresponding to the newly-registered user identity.

1103: The server determines a target multimedia file of the newly-registered user identity according to the multimedia file category.

This step is similar to step 1004, and is not described herein again.

1104: The server pushes the target multimedia file.

This step is similar to the foregoing step 1005, and is not described herein again.

It should be noted that after the to-be-pushed multimedia file is pushed, a floating layer closing function is further provided. That is, after the to-be-pushed multimedia file is pushed to a user terminal, if a user is not interested in the multimedia file, when a terminal pointer is located at an area where the to-be-pushed multimedia file is located, a closable floating layer shown in FIG. 5 appears in a preset area of the area where the to-be-pushed multimedia file is located. When the user clicks a close button of the closable floating layer, the pushed multimedia file is hidden automatically, so as to prevent the pushed multimedia file from disturbing the user and reducing user experience.

In the method provided in this embodiment, when a newly-registered user identity is detected, a multimedia file category corresponding to the newly-registered user identity is determined based on a user relation chain of the newly-registered user identity, and then a multimedia file is pushed to the newly-registered user identity according to the multimedia file category. Because the multimedia file category that interests the newly-registered user identity is determined, the multimedia file can be pushed to a targeted newly-registered user, thereby improving push accuracy of the multimedia file.

Figure 12:
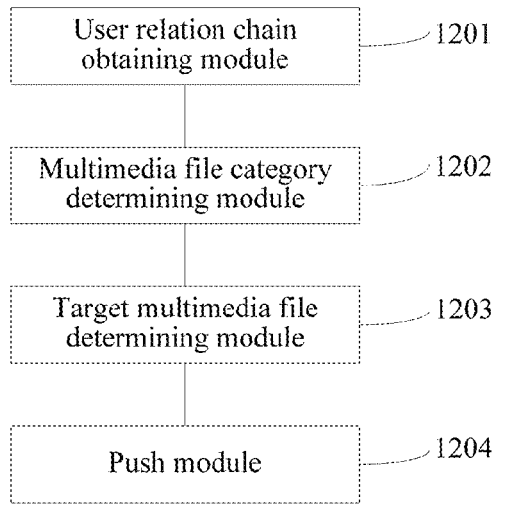
FIG. 12 is a schematic structural diagram of an information push apparatus according to another embodiment of the present invention.

FIG. 12 is a schematic diagram of an information push apparatus according to an embodiment of the present invention. Referring to FIG. 12, the apparatus provided in this embodiment includes: a user relation chain obtaining module 1201, a multimedia file category determining module 1202, a target multimedia file determining module 1203, and a push module 1204.

The user relation chain obtaining module 1201 is configured to obtain, when a newly-registered user identity is detected, a user relation chain of the newly-registered user identity; the multimedia file category determining module 1202 is configured to determine a multimedia file category corresponding to the newly-registered user identity according to the user relation chain; the target multimedia file determining module 1203 is configured to determine a target multimedia file of the newly-registered user identity according to the multimedia file category; and the push module 1204 is configured to push the target multimedia file.

Optionally, the multimedia file category determining module includes:

a user identity determining unit, configured to determine a reference user identity in the user relation chain, where the reference user identity is a registered user identity that has a frequency of interaction with the newly-registered user identity greater than a preset threshold; and a multimedia file category determining unit, configured to determine, according to a multimedia file category corresponding to the reference user identity, the multimedia file category corresponding to the newly-registered user identity.

Optionally, the multimedia file category determining unit is configured to: determine, if there is one reference user identity, a multimedia file category corresponding to the registered user identity as the multimedia file category corresponding to the newly-registered user identity; or, determine, if there are multiple reference user identities, a multimedia file category corresponding to a reference user identity that has the highest frequency of interaction with the newly-registered user identity as the multimedia file category corresponding to the newly-registered user identity.

Optionally, the multimedia file category determining module is configured to: make statistics, according to a multimedia file category corresponding to each registered user identity in the user relation chain, on the number of registered user identities corresponding to each multimedia file category; and determine a multimedia file category that has most registered user identities as the multimedia file category corresponding to the newly-registered user identity.

In the apparatus provided in this embodiment, when a newly-registered user identity is detected, a multimedia file category corresponding to the newly-registered user identity is determined based on a user relation chain of the newly-registered user identity, and then a multimedia file is pushed to the newly-registered user identity according to the multimedia file category. Because the multimedia file category that interests the newly-registered user identity is determined, the multimedia file can be pushed to a targeted newly-registered user, thereby improving push accuracy of the multimedia file.

It should be noted that: when the multimedia file push apparatus provided in the foregoing embodiment pushes a multimedia file, division of the foregoing functional modules is merely used as an example for description; in an actual application, the foregoing functions may be distributed to be completed by different functional modules according to needs, that is, an internal structure of a device is divided into different functional modules, so as to complete all or some of the functions described above. In addition, the multimedia file push apparatus provided in the foregoing embodiment and the multimedia file push method embodiment belong to same conception. Refer to the method embodiment for a specific implementation process of the multimedia file push apparatus, which is not described herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a non-transitory computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A multimedia file push method, comprising:
obtaining first visual feature information, the first visual feature information being visual feature information of a to-be-pushed multimedia file;
determining a first user identity according to the first visual feature information, the first user identity being a push target user identity of the to-be-pushed multimedia file; and
pushing the to-be-pushed multimedia file according to the first user identity,
wherein the determining a first user identity according to the first visual feature information comprises:
determining a multimedia file that is similar to the to-be-pushed multimedia file according to the first visual feature information;
obtaining a second user identity according to a historical push process of the similar multimedia file, wherein the second user identity is a push target user identity of the similar multimedia file; and
determining the first user identity according to the second user identity.

2. The method according to claim 1, wherein the visual feature information is at least one of pixel feature information, global feature information and detail feature information.

3. The method according to claim 1, wherein the determining a multimedia file that is similar to the to-be-pushed multimedia file according to the first visual feature information comprises:
determining, for one pushed multimedia file among multiple pushed multimedia files, whether similarity between visual feature information of the pushed multimedia file and the first visual feature information is greater than a preset threshold; and
determining the pushed multimedia file as the multimedia file that is similar to the to-be-pushed multimedia file if the similarity between the visual feature information of the pushed multimedia file and the first visual feature information is greater than the preset threshold.

4. The method according to claim 1, wherein the determining the first user identity according to the second user identity comprises:
determining the second user identity as the first user identity; or
determining a feedback user identity in the second user identity as the first user identity; or
determining the second user identity and multiple user identities in a user relation chain of the second user identity as the first user identity.

5. The method according to claim 4, wherein the pushing the to-be-pushed multimedia file according to the first user identity comprises:
determining a push user type corresponding to the to-be-pushed multimedia file according to the feedback user identity;
obtaining, from a correspondence between the push user type and a push user identity, the push user identity corresponding to the push user type; and
pushing the to-be-pushed multimedia file according to the push user identity corresponding to the push user type.

6. The method according to claim 1, wherein before the determining a first user identity according to the first visual feature information, the method further comprises:
obtaining second visual feature information and a third user identity, and establishing a push prediction model based on a correspondence between the second visual feature information and the third user identity, wherein the second visual feature information is visual feature information of each pushed multimedia file and the third user identity is a push target user identity of each pushed multimedia file; or
obtaining second visual feature information and a fourth user identity, and establishing a push prediction model based on a correspondence between the second visual feature information and the fourth user identity, wherein the fourth user identity is a feedback user identity of each pushed multimedia file.

7. The method according to claim 6, wherein the determining a first user identity according to the first visual feature information comprises:
searching, based on the push prediction model, for a push target user identity corresponding to the first visual feature information, and determining the found push target user identity as the first user identity.

8. The method according to claim 1, wherein after the determining the first user identity according to the first visual feature information, the method further comprises:
pushing, when it is detected that a newly-registered user identity exists in a user relation chain of a registered user identity and if the registered user identity belongs to the first user identity, the to-be-pushed multimedia file according to the newly-registered user identity.

9. A multimedia file push apparatus, comprising:
at least one processor; and
a memory connected with the at least one processor, the memory comprising a plurality of program instructions executable by the at least one processor, the program instructions comprising:
a visual feature information obtaining module, configured to cause the at least one processor to obtain first visual feature information, the first visual feature information being visual feature information of a to-be-pushed multimedia file;
a user identity determining module, configured to cause the at least one processor to determine a first user identity according to the first visual feature information, the first user identity being a push target user identity of the to-be-pushed multimedia file; and
a push module, configured to cause the at least one processor to push the to-be-pushed multimedia file according to the first user identity,
wherein the visual feature information obtaining module comprises:
a multimedia file determining unit, configured to cause the at least one processor to determine a multimedia file that is similar to the to-be-pushed multimedia file according to the first visual feature information;
a user identity obtaining unit, configured to cause the at least one processor to obtain a second user identity according to a historical push process of the similar multimedia file, wherein the second user identity is a push target user identity of the similar multimedia file; and
a user identity determining unit, configured to cause the at least one processor to determine the first user identity according to the second user identity.

10. The apparatus according to claim 9, wherein the multimedia file determining unit is configured to cause the at least one processor to: determine, for one pushed multimedia file among multiple pushed multimedia files, whether similarity between visual feature information of the pushed multimedia file and the first visual feature information is greater than a preset threshold; and determine the pushed multimedia file as the multimedia file that is similar to the to-be-pushed multimedia file if the similarity between the visual feature information of the pushed multimedia file and the first visual feature information is greater than the preset threshold.

11. The apparatus according to claim 9, wherein the user identity determining unit is configured to cause the at least one processor to: determine the second user identity as the first user identity; or, determine a feedback user identity in the second user identity as the first user identity; or, determine the second user identity and multiple user identities in a user relation chain of the second user identity as the first user identity.

12. The apparatus according to claim 11, wherein the push module is configured to cause the at least one processor to: determine a push user type corresponding to the to-be-pushed multimedia file according to the feedback user identity; obtain, from a correspondence between the push user type and a push user identity, the push user identity corresponding to the push user type; and push the to-be-pushed multimedia file according to the push user identity corresponding to the push user type.

13. The apparatus according to claim 9, further comprising:
a push prediction model establishing module, configured to cause the at least one processor to: obtain second visual feature information and a third user identity, and establish a push prediction model based on a correspondence between the second visual feature information and the third user identity, wherein the second visual feature information is visual feature information of each pushed multimedia file and the third user identity is a push target user identity of each pushed multimedia file; or, obtain the second visual feature information and a fourth user identity, and establish a push prediction model based on a correspondence between the second visual feature information and the fourth user identity, wherein the fourth user identity is a feedback user identity of each pushed multimedia file.

14. The apparatus according to claim 13, wherein the user identity determining module is configured to cause the at least one processor to search, based on the push prediction model, for a push target user identity corresponding to the first visual feature information, and determine the found push target user identity as the first user identity.

15. The apparatus according to claim 9, wherein the push module is further configured to cause the at least one processor to push, when it is detected that a newly-registered user identity exists in a user relation chain of a registered user identity and if the registered user identity belongs to the first user identity, the to-be-pushed multimedia file according to the newly-registered user identity.

16. A multimedia file push method, comprising:
obtaining, when a newly-registered user identity is detected, a user relation chain of the newly-registered user identity;
determining a multimedia file category corresponding to the newly-registered user identity according to the user relation chain;
determining a target multimedia file of the newly-registered user identity according to the multimedia file category; and
pushing the target multimedia file,
wherein the determining a multimedia file category corresponding to the newly-registered user identity according to the user relation chain comprises:
determining a reference user identity in the user relation chain, wherein the reference user identity is a registered user identity that has a frequency of interaction with the newly-registered user identity greater than a preset threshold; and
determining, according to a multimedia file category corresponding to the reference user identity, the multimedia file category corresponding to the newly-registered user identity.

17. The method according to claim 16, wherein the determining, according to a multimedia file category corresponding to the reference user identity, the multimedia file category corresponding to the newly-registered user identity comprises:
determining, if there is one reference user identity, a multimedia file category corresponding to the registered user identity as the multimedia file category corresponding to the newly-registered user identity; or
determining, if there are multiple reference user identities, a multimedia file category corresponding to a reference user identity that has the highest frequency of interaction with the newly-registered user identity as the multimedia file category corresponding to the newly-registered user identity.

18. A multimedia file push method, comprising:
obtaining, when a newly-registered user identity is detected, a user relation chain of the newly-registered user identity;
determining a multimedia file category corresponding to the newly-registered user identity according to the user relation chain;
determining a target multimedia file of the newly-registered user identity according to the multimedia file category; and
pushing the target multimedia file,
wherein the determining a multimedia file category corresponding to the newly-registered user identity according to the user relation chain comprises:
making statistics, according to a multimedia file category corresponding to each registered user identity in the user relation chain, on the number of registered user identities corresponding to each multimedia file category; and
determining a multimedia file category that has most registered user identities as the multimedia file category corresponding to the newly-registered user identity.

19. The method according to claim 16, wherein the frequency of interaction is at least one of a mutual commenting frequency, a message sending frequency, a conversation frequency and a personal page visiting frequency.

20. A multimedia file push apparatus, the apparatus comprising:
at least one processor; and
a memory connected with the at least one processor, the memory comprising a plurality of program instructions executable by the at least one processor, the program instructions comprising:
a user relation chain obtaining module, configured to cause the at least one processor to obtain, when a newly-registered user identity is detected, a user relation chain of the newly-registered user identity;
a multimedia file category determining module, configured to cause the at least one processor to determine a multimedia file category corresponding to the newly-registered user identity according to the user relation chain;
a target multimedia file determining module, configured to cause the at least one processor to determine a target multimedia file of the newly-registered user identity according to the multimedia file category; and
a push module, configured to cause the at least one processor to push the target multimedia file,
wherein the multimedia file category determining module comprises:
a user identity determining unit, configured to cause the at least one processor to determine a reference user identity in the user relation chain, wherein the reference user identity is a registered user identity that has a frequency of interaction with the newly-registered user identity greater than a preset threshold; and
a multimedia file category determining unit, configured to cause the at least one processor to determine, according to a multimedia file category corresponding to the reference user identity, the multimedia file category corresponding to the newly-registered user identity.

21. The apparatus according to claim 20, wherein the multimedia file category determining unit is configured to cause the at least one processor to: determine, if there is one reference user identity, a multimedia file category corresponding to the registered user identity as the multimedia file category corresponding to the newly-registered user identity; or, determine, if there are multiple reference user identities, a multimedia file category corresponding to a reference user identity that has the highest frequency of interaction with the newly-registered user identity as the multimedia file category corresponding to the newly-registered user identity.

22. The apparatus according to claim 20, wherein the multimedia file category determining module is configured to cause the at least one processor to: make statistics, according to a multimedia file category corresponding to each registered user identity in the user relation chain, on the number of registered user identities corresponding to each multimedia file category; and determine a multimedia file category that has most registered user identities as the multimedia file category corresponding to the newly-registered user identity.

* * * * *